United States Patent [19]

Pavlik

[11] Patent Number: 4,807,727

[45] Date of Patent: Feb. 28, 1989

[54] METHOD AND APPARATUS FOR SECURING A TORQUE APPLYING DEVICE

[75] Inventor: Dennis J. Pavlik, Eagan, Minn.

[73] Assignee: The Toro Company, Minneapolis, Minn.

[21] Appl. No.: 99,284

[22] Filed: Sep. 21, 1987

[51] Int. Cl.[4] ............... F16D 63/00; F16D 67/02; B60T 13/04; A01D 69/10
[52] U.S. Cl. .................. 188/84; 56/11.3; 56/306; 74/526; 188/171; 192/30 V; 192/12 D; 267/137
[58] Field of Search ............ 188/84, 166, 171, 77 R, 188/158, 159, 161-163, 378-380; 267/136, 137, 140; 74/526; 56/11.3, 10.8, 306, DIG. 6; 192/30 V, 149, 12 D

[56] References Cited

U.S. PATENT DOCUMENTS

| | | | |
|---|---|---|---|
| 3,717,231 | 2/1973 | Kaufeldt | 192/149 X |
| 4,048,787 | 9/1977 | Harkness et al. | 56/11.3 |
| 4,195,826 | 4/1980 | Weinke et al. | 267/137 |
| 4,633,980 | 1/1987 | Lambertson | 188/84 |

OTHER PUBLICATIONS

Prior art sketches related to the "Background of the Invention" on application pp. 1-3.

Primary Examiner—Andres Kashnikow
Assistant Examiner—Robert J. Oberleitner
Attorney, Agent, or Firm—R. Lawrence Buckley

[57] ABSTRACT

Method and apparatus for securing an electric brake/clutch (14) against rotation relative to a stationary member (10). A preferred system includes an anti-rotation lever (26) attached to and extending from a brake/clutch housing (16). Anti-rotation lever (26) includes a flange (32) at its free end. Flange (32) is situated between a pair of spaced opposed rubber bumpers (34) attached to stationary member (10). Thus, torque applied to the housing (16) of brake/clutch (14) is transmitted through anti-rotation lever (26), rubber bumper (34), and ultimately to stationary member (10). The distance between rubber bumpers (34) exceeds the thickness of flange (32), whereby anti-rotation lever (26) and housing (16) can radially float relative to stationary member (10), thereby permitting "runout" of brake/clutch assembly (14).

10 Claims, 1 Drawing Sheet

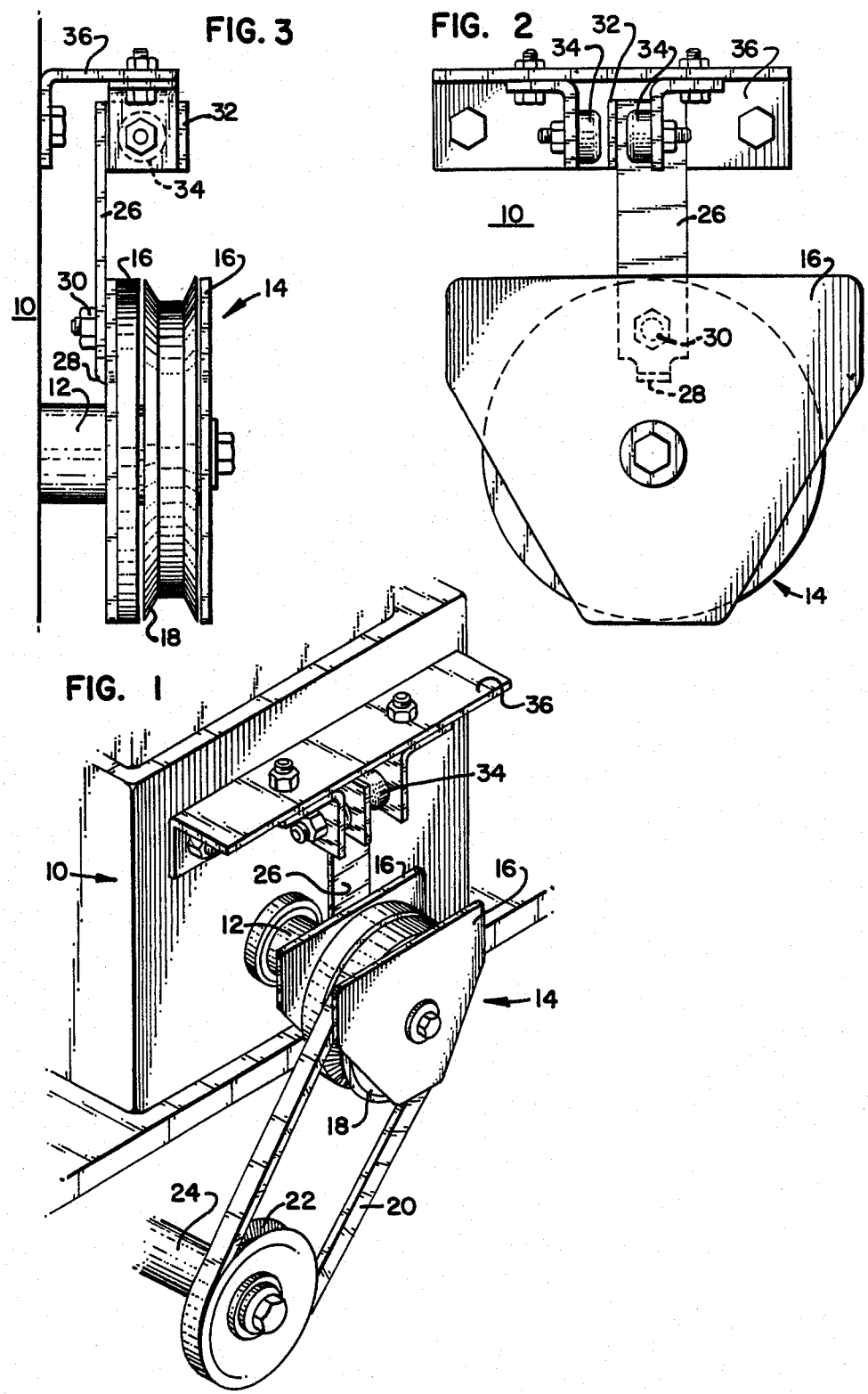

METHOD AND APPARATUS FOR SECURING A TORQUE APPLYING DEVICE

TECHNICAL FIELD

This invention relates generally to clutches and brakes and more particularly to means for securing the housings or casings of such devices against rotation.

BACKGROUND OF THE INVENTION

As noted above, the invention pertains generally to clutches and brakes. For the sake of brevity the invention will be described in terms of electric clutches and brakes, but the invention could be used in conjunction with other types of clutches and brakes.

As well known to those skilled in the art, electric clutches and brakes typically include an input member, an output member and a casing or housing which contains electromagnetic components suitable for selectively coupling the input and output members. In the case of an electric clutch, the housing or casing contains electromagnetic components suitable for selectively coupling the input and output members (e.g., axially-aligned shafts) to cause them to rotate together. By contrast, the housing of a brake contains electromagnetic components suitable for selectively coupling the input member (typically a shaft) to the output member which is rigidly connected to the housing which in turn is rigidly connected to a stationary point. In addition to electric clutches and brakes, there are combination clutches/brakes which can either selectively couple a pair of shafts or apply a braking torque to an input shaft.

In all cases, i.e., clutches, brakes, and combination brakes/clutches, there is a need to secure the housing or casing of the torque applying device against rotation. For all three types of devices, there are wires running from an electrical power source to the electromagnetic components within the housing. Unless slip rings or the like are used, the housing or casing of a clutch or brake/clutch must be secured against rotation to prevent the wires from wrapping around the rotating members. Also, it is obviously necessary to secure the housing of a brake against rotation so that braking torque can be applied to the rotating input member to reduce its speed.

While the present invention could be applied to a wide variety of electric clutches, brakes, and brakes/clutches, for the sake of brevity the remainder of this discussion and the detailed description of the invention will focus on combination brakes/clutches. Such devices are used between the prime mover and mower blade of large commercial turf mowers. When it is desired to cut grass, the clutch is activated to couple the prime mover to the mower blade. The clutch is de-energized to stop the blade.

Securing a brake/clutch housing against rotation has been a long-standing problem. Historically, simple threaded connectors or the like were used to fasten the brake/clutch housing or lever arm extending therefrom to a nearby stationary member. While this might seem to be a simple solution to the problem, it has been discovered that this connection scheme is fraught with many problems of its own. For example, the threaded connector (or the like) can loosen over an extended period of time and become the source of bothersome noise and vibration. Furthermore, the connector between the brake/clutch housing (or housing lever arm) and the stationary member can fatigue and break. When this happens, the brake/clutch becomes nonfunctional, potentially leading to a dangerous situation in the event braking is immediately needed.

The loosening and fatiguing problems discussed above are thought to be primarily attributable to two sources: (i) torque induced on the housing (and/or housing lever arm) during normal operation of the device; and (ii) forces caused by "runout." Runout is defined herein as any radial motion of the housing. Runout can be caused by an eccentric or loose input shaft, or a poorly constructed brake/clutch. Runout can result in a sizable amount of stress at the connection point between the housing (or lever arm extending therefrom) of the brake/clutch and the stationary member. If runout is eliminated by very rigidly clamping the brake/clutch housing to a stationary member, this can cause undue stress on the internal mechanism of the brake/clutch. On the other hand, if the traditional housing securing technique is used (i.e., simple threaded connector or the like), and runout is permitted to some degree, a destructive sawing action can result between adjoining parts.

The present invention addresses the problems associated with securing a brake/clutch housing to a stationary member. In particular, the invention is directed toward accommodating "runout" while preventing the housing connector from breaking due to fatigue, "sawing action" or the like.

SUMMARY OF THE INVENTION

Accordingly, one embodiment of the invention is an apparatus for operatively securing the housing of a torque applying device to a stationary member, including:

(a) an anti-rotation lever having first and second ends, wherein the first end is suitable for attachment to the housing and the second end can be positioned such that the lever extends substantially radially from the housing; and (b) means suitable for operative attachment to the stationary member for receiving the anti-rotation lever second end, wherein when the apparatus is utilized torque applied to the housing is transmitted through the anti-rotation lever, the second end receiving means, and finally to the stationary member, and runout of the torque applying device is freely accommodated.

In a preferred embodiment, the anti-rotation lever second end includes a flange, and the "second end receiving means" includes a pair of spaced resilient elements, wherein the flange is located between the resilient elements. The distance between the resilient elements is preferably greater than the thickness of the flange, whereby the anti-rotation lever and the torque applying device housing can radially float relative to the resilient elements, and "runout" of the torque applying device is freely accommodated.

Another embodiment of the invention is an entire torque applying apparatus which includes a torque applying device (e.g., electric brake/clutch) and the system described above for securing the housing of the torque applying device to a stationary member.

The invention also includes a method for securing the housing of an electric brake/clutch against rotation relative to a stationary member, including:

(a) selecting an anti-rotation lever having first and second ends, wherein the second end comprises a flange;

(b) connecting the first end of the anti-rotation lever to the brake/clutch housing such that the lever extends substantially radially therefrom and the second end is free;

(c) selecting a pair of resilient bumpers;

(d) attaching the resilient bumpers to the stationary member such that the distance between the bumpers is greater than the thickness of the flange, wherein torque applied to the housing is transmitted through the anti-rotation lever, the resilient bumpers, and finally to the stationary member, and runout of the brake/clutch is freely accommodated.

Additional features of the preferred embodiment of the invention are described below with reference to the appended drawings.

BRIEF DESCRIPTION OF THE DRAWINGS

The invention will be further described with reference to the Drawings, wherein:

FIG. 1 is a perspective view of one embodiment of the present invention, including an electric brake/clutch and means for securing the housing of the brake/clutch;

FIG. 2 is an enlarged front elevational view of the brake/clutch and brake/clutch securing means shown in FIG. 1; and FIG. 3 is an enlarged side elevational view of the brake/clutch and brake/clutch securing means shown in FIG. 1.

DETAILED DESCRIPTION OF THE INVENTION

A preferred embodiment of the invention can now be described in detail with reference to the Drawings, wherein like reference numerals designate like parts and assemblies throughout the several views. FIG. 1 of the Drawings diagrammatically illustrates a prime mover 10, e.g., an internal combustion engine, having an output shaft 12. Mounted on the far end of shaft 12 is an electric brake/clutch assembly 14. Brake/clutch assembly 14 includes a stationary housing 16 and an output pulley 18 which can be selectively coupled to input shaft 12 through the electrical energization of components within clutch housing 16. Wires (not shown) would connect the internal electromagnetic components to an electrical power source so that an appropriate amount of electrical power could be selectively provided to brake/clutch 14. Such electric brakes/clutches are well known to those skilled in the art. One electric brake/clutch which meets this description is the Ogura clutch sold by Kanematsu-Goshu under the MA-GT-TR03 designation.

The clutch pulley 18 is connected by a V-belt 20 to another pulley 22 which is rotatably supported by prime mover 10 or its supporting frame. Extending from and connected to pulley 22 is a power-take-off (PTO) shaft 24 which can be attached to the rotary blade of a lawn mower, for example. Thus, by selective electrical activation of brake/clutch assembly 14 mechanical power can be transferred from prime mover 10 to PTO shaft 24 and ultimately to the cutting unit of a lawn mower. When the brake/clutch is de-energized, it acts as a brake to quickly stop the rotation of the grass cutting blade. Those skilled in the art will recognize that the lawn mower application described herein is not exclusive or exhaustive, but is only one possible application for the present invention.

Referring to FIGS. 2 and 3, extending vertically upward from clutch housing 16 is an anti-rotation lever 26. Lever 26 includes a projecting tab 28 at its lower end which is received by an aperture in the prime mover side of housing 16. In addition, located immediately above tab 28 is a standard threaded connector 30 which secures lever 26 to housing 16. Tab 28 and threaded connector 30 work in combination to securely interconnect anti-rotation lever 26 and housing 16. Of course, there are other ways to secure lever 26 to housing 16, including welding. Lever 26 terminates at its upper end with a right angle flange 32 situated between a pair of opposed resilient bumpers 34. Each bumper 34 is fixed to prime mover 10 by right angle brackets 36 through the use of standard threaded connectors. Bumpers 34 can be rubber bumpers sold by Elastomeric Products under the designation No. 1343. Bumpers 34 are preferably made of 60 durometer rubber but the durometer could be adjusted depending on the application. In fact, the durometer could go as high as 80 or 90, or higher, for high torque applications. It should be noted that it is not necessary to include rubber bumpers 34. That is, bumpers 34 could be eliminated and the clutch securing system would function, but in a noisy fashion. It should also be noted that rubber bumpers 34 could be replaced by metallic springs or some type of damper or shock absorbing means. Finally, lever 26 can be any length, depending primarily on the amount of space available and on the brake/clutch housing torque which must be absorbed. In the specific embodiment shown in the Drawings, lever 26 is approximately 5 inches long and is made of 12 gauge sheet steel.

Preferably, there is some play between flange 32 and bumpers 34. Play is accommodated so that shaft 12 and brake/clutch assembly 14 can freely move radially to some degree (experience "runout"). Brake/clutch 14 is thereby permitted to seek its own position. Although any amount of play could be provided, in the preferred embodiment approximately 0.06 inch of space is established between flange 32 and bumpers 34. That is, the distance between bumpers 34 exceeds the thickness of flange 32 by 0.06 inch in this embodiment. The gap is exaggerated in FIG. 2 for the sake of clear illustration of the principle. If the gap is too excessive, flange 32 will strike bumpers 34 with significant momentum. On the other hand, some play should be permitted to allow for brake/clutch runout.

In operation, flange 32 can normally move freely between bumpers 34 to seek its own position. When brake/clutch assembly 14 is electrically activated, however, or whenever torque is applied to housing 16, flange 32 strikes one of the bumpers 34 so that the torque on housing 16 is in effect quietly absorbed by prime mover block 10. Thus, flange 32 isn't necessarily continuously in contact with either one of the bumpers 34, but on occasion, i.e., when housing 16 is subjected to a significant torque, it is necessary for anti-rotation lever 26 to transfer torque from housing 16 to one of the bumpers 34, brackets 36, and ultimately to prime mover 10. It can therefore be seen that the use of bumpers 34 and attendant parts allows free runout of shaft 12 and clutch assembly 14 and also makes for a quiet and durable brake/clutch securing means.

There are other modifications which will be apparent to those skilled in the art. Accordingly, the scope of this invention will be limited only by the appended claims.

I claim:

1. An apparatus for operatively securing the housing of an electric brake/clutch to a stationary member, comprising:
   (a) an anti-rotation lever having first and second ends, wherein the first end is suitable for attachment to the housing through a connection means and the second end can be positioned such that the lever extends substantially radially from the housing; and
   (b) means suitable for operative attachment to the stationary member for receiving the anti-rotation lever second end, wherein when the apparatus is utilized torque applied to the housing is transmitted through the anti-rotation lever, the second end receiving means, and finally to the stationary member, and runout of the electric brake/clutch is freely accommodated.

2. The apparatus of claim 1, wherein the second end receiving means comprises a pair of spaced elements, wherein the second end of the anti-rotation lever is situated between the spaced elements and can radially float therebetween.

3. The apparatus of claim 2, wherein the spaced elements comprise resilient elements.

4. The apparatus of claim 3, wherein the resilient elements comprise rubber bumpers.

5. The apparatus of claim 4, wherein the rubber bumpers are approximately 60 durometer in hardness.

6. The apparatus of claim 2, wherein the second end of the anti-rotation lever comprises a flange; the second end receiving means comprises a pair of resilient bumpers; and the distance between the resilient bumpers is greater than the thickness of the flange, whereby the anti-rotation lever and the torque applying device housing can radially float relative to the bumpers.

7. The apparatus of claim 6, wherein the distance between the bumpers exceeds the flange thickness by approximately 0.06 inch.

8. An apparatus for operatively securing the housing of an electric brake/clutch to a stationary member, comprising:
   (a) an anti-rotation lever having first and second ends, wherein the first end is suitable for attachment to the brake/clutch housing through a connection means and the second end comprises a flange which can be positioned such that the lever extends radially from the housing; and
   (b) a pair of spaced rubber bumpers suitable for attachment to the stationary member for receiving the anti-rotation lever flange, wherein the distance between the rubber bumpers is greater than the thickness of the flange, whereby torque applied to the brake/clutch housing is transmitted through the anti-rotation lever, the rubber bumpers, and finally to the stationary member, and runout of the brake/clutch is freely accommodated.

9. A torque applying apparatus suitable for use adjacent a stationary member, comprising:
   (a) an electric brake/clutch comprising a housing;
   (b) an anti-rotation lever having first and second ends, wherein the first end is attached to the housing through a connection means and the second end is positioned such that the lever extends substantially radially from the housing; and
   (c) means suitable for operative attachment to the stationary member for receiving the anti-rotation lever second end, wherein torque applied to the housing is transmitted through the anti-rotation lever, the second end receiving means, and finally to the stationary member, and runout of the electric brake/clutch is freely accommodated.

10. A method for securing the housing of an electric brake/clutch against rotation relative to a stationary member, comprising:
   (a) selecting an anti-rotation lever having first and second ends, wherein the second end comprises a flange;
   (b) connecting the first end of the anti-rotation lever to the brake/clutch housing or connection means such that the lever extends substantially radially therefrom and the second end is free;
   (c) selecting a pair of resilient bumpers;
   (d) attaching the resilient bumpers to the stationary member such that the distance between the bumpers is greater than the thickness of the flange, wherein torque applied to the housing is transmitted through the anti-rotation lever, the resilient bumpers, and finally to the stationary member, and runout of the brake/clutch is freely accommodated.

* * * * *